No. 650,924. Patented June 5, 1900.
J. W. BOYNTON.
INSERTED TOOTH MILLING CUTTER.
(Application filed June 23, 1899.)
(No Model.)
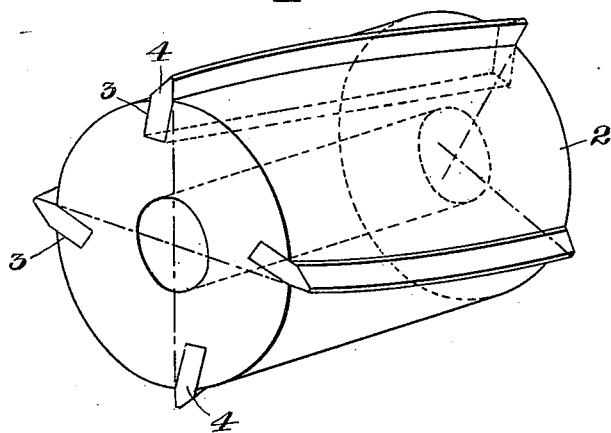
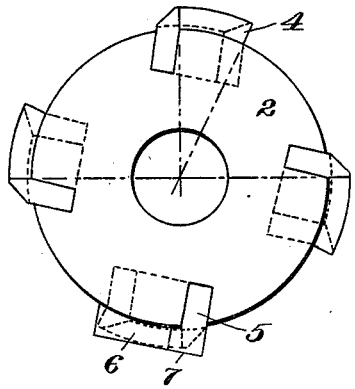 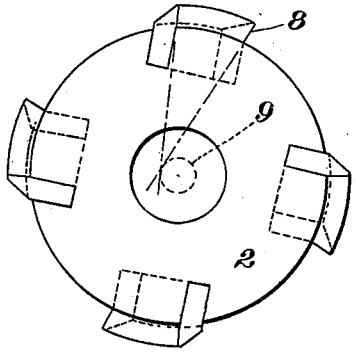
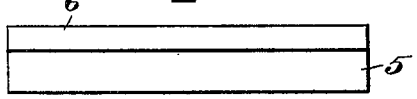 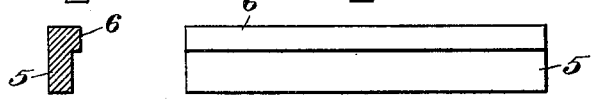
WITNESSES.
A. D. Grover.
Fred. E. Dorr.
INVENTOR.
John W. Boynton
by Alex. P. Browne,
attorney.

UNITED STATES PATENT OFFICE.

JOHN W. BOYNTON, OF NEW BEDFORD, MASSACHUSETTS, ASSIGNOR TO THE MORSE TWIST DRILL AND MACHINE COMPANY, OF SAME PLACE.

INSERTED-TOOTH MILLING-CUTTER.

SPECIFICATION forming part of Letters Patent No. 650,924, dated June 5, 1900.

Application filed June 23, 1899. Serial No. 721,558. (No model.)

*To all whom it may concern:*

Be it known that I, JOHN W. BOYNTON, a citizen of the United States, residing at New Bedford, in the county of Bristol and State of Massachusetts, have invented certain new and useful Improvements in Inserted-Tooth Milling-Cutters, of which the following is a specification.

In manufacturing milling-cutters of large diameter it has heretofore been the custom to make them with a cast-iron or soft-steel hub appropriately grooved to receive the cutting-teeth, which are formed of tool-steel and inserted in said grooves. It has furthermore been the custom in many cases to insert these teeth at an angle to the axis of the cutter in order that the cutter may make a shearing cut when in operation. In such cases it has been the invariable custom, so far as I am aware, to give the inserted tooth a plane cutting-face, or, in other words, a face which has no curvature in any direction. The result of this construction is that by reason of the aforesaid angle between the tooth and the axis of the hub the angle between the cutting-face of the tooth and the cylindrical surface of the hub varies continuously from one end of the tooth to the other, so that the said cutting-face of the tooth can lie at one point only in its theoretically-correct position, which is such that the cutting-face is everywhere normal to the adjacent cylindrical surface of the hub or, in the case of a hooking-tooth, at a constant acute angle thereto. It has also heretofore been proposed to form an inserted-tooth milling-cutter by suitably disposing a series of spirally-formed cutting-teeth around a suitable central sleeve or spindle and uniting said parts by casting a soft-metal body between and around them.

It has been found that the first above-described class of cutters, in which a solid grooved-hub is employed, possesses advantages over the composite cast structure later referred to, and my present improvement relates to inserted-tooth cutters the hubs of which are formed and grooved prior to the insertion of the teeth.

In the accompanying drawings, Figure 1 is a perspective view illustrating a cutter formed in accordance with my invention. Figs. 2 and 3 are end views of similar cutters, further illustrating my improvement. Figs. 4 and 5 are respectively a side elevation and a cross-section of a tooth before it has been turned and milled, as hereinafter described.

My improved method of producing an inserted-tooth cutter consists in first forming the tooth with a plane face, then inserting the same in position in a hub properly grooved to receive it, turning its outer flat face to correspond with the cylindrical hub, and, finally, milling or otherwise working the cutting-face of the tooth, while in position in the hub, into a spiral surface normal at all points to the surface of the hub or at a constant acute angle thereto.

As it is often desirable to make these cutters of considerable length for use on heavy work, the amount of departure from the proper location in such case becomes considerable, and by means of my improvement, whereby this is corrected, I produce a much better and more efficient tool than was produced under the old methods.

In the drawings the hub 2 is shown as cast or otherwise provided with a suitable number of grooves 3, each adapted to receive and retain an inserted tooth 4. In Fig. 2 is shown a tooth 5 as it appears when first inserted in the hub 2—that is to say, with its cutting-face 6 flat and lying wholly in one plane. After the teeth have been inserted in the form shown at 5 in Fig. 2 their outer edges are turned and then made concentric at all points with the cylindrical hub and the faces 6 are milled down to the dotted line 7, which indicates the cutting-face of the tooth as it is when finished, when, as will be observed, it is everywhere normal to the surface of the cylindrical hub 2, so that the said cutting-face if prolonged toward the center of the hub would form a spiral surface composed of radial lines or lines passing through the axis of the cylinder.

In case a hooking-tooth is desired the teeth 5 may be so milled that their cutting-faces 8, Fig. 3, will ultimately lie at every point in a plane tangent to a small cylinder 9 concentric with the axis of the cutter, as shown in Fig. 3. The cutting-face 8 will thereby be made to lie at an acute angle with the surface of the hub 2, but such angle will be constant throughout the length of the cutting-face.

It will be understood that in place of inserting the plane-faced teeth 5 in their final position in the hub 2 before milling their cutting-faces, they may be inserted in a blank or pattern corresponding in its dimensions and in the arrangement of its grooves to the hub 2 and milled therein and afterward removed therefrom and inserted in their final position in the hub 2.

It will be seen that in constructing a cutter in accordance with my invention the grooves in the hub for receiving the cutting-teeth have perfectly plane sides, and hence are easily formed or cut as compared with the spiral grooves, which must be cut to receive previously-formed teeth, when the latter are inserted after the hub has been finished.

I claim—

An inserted-tooth milling-cutter comprising a hub provided with one or more rectilinear grooves arranged at an angle to its axis, and a cutting-tooth having a rectilinear body portion contained in each of said grooves and having a spiral cutting-face, making at all points a constant angle to the periphery of the cutter.

In testimony whereof I have hereunto subscribed my name this 27th day of May, 1899.

JOHN W. BOYNTON.

Witnesses:
E. D. CHADWICK,
E. B. TOMLINSON.